(No Model.)
G. BARDONNER.
VEHICLE SPRING.
No. 410,262. Patented Sept. 3, 1889.
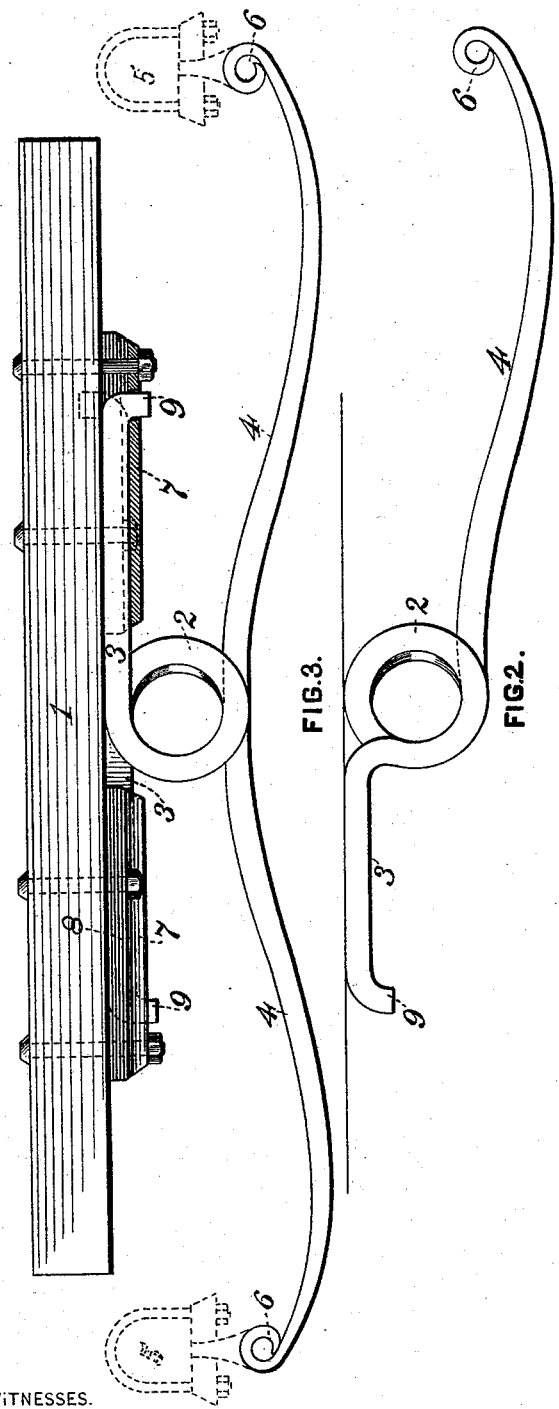
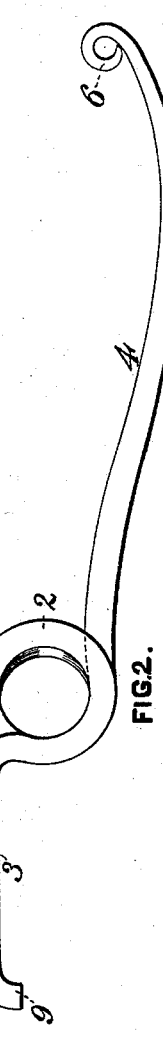
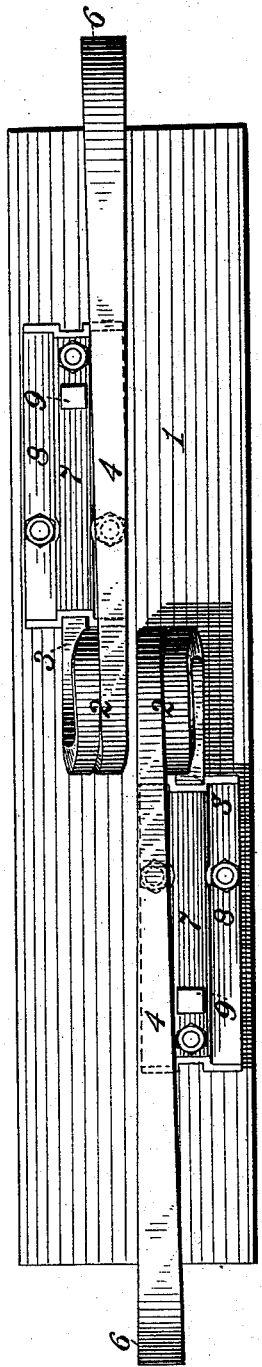
WITNESSES.
Danwin S. Wolcott
F. E. Gaither.
INVENTOR.
George Bardonner
By George H. Christy Att'y.

UNITED STATES PATENT OFFICE.

GEORGE BARDONNER, OF ALLEGHENY, PENNSYLVANIA.

VEHICLE-SPRING.

SPECIFICATION forming part of Letters Patent No. 410,262, dated September 3, 1889.

Application filed December 13, 1888. Serial No. 293,453. (No model.)

*To all whom it may concern:*

Be it known that I, GEORGE BARDONNER, a citizen of the United States, residing at Allegheny, in the county of Allegheny and State of Pennsylvania, have invented or discovered certain new and useful Improvements in Vehicle-Springs, of which improvements the following is a specification.

The invention described herein relates to certain improvements in springs for vehicles, and has for its object a construction of spring wherein the natural resistance of the bar forming the spring is supplemented by the resistance presented by a coil formed of resilient material as against the opening or closing of its coils.

In general terms, the invention consists in the construction and arrangement of mechanical devices or elements, all as more fully hereinafter described and claimed.

In the accompanying drawings, forming a part of this specification, Figure 1 is a view in elevation showing my improved springs as applied to a vehicle. Fig. 2 is a plan view of the same, and Fig. 3 is a view in elevation of a modified form of spring.

In the practice of my invention I form in a steel bar, of suitable length and cross-sectional size, a coil 2 of one, two, or more complete turns, dependent upon the load which the spring is designed to support. The coil 2 is formed at such a point between the ends of the bar that after the formation of the coil the ends of the bar will project tangentially from opposite sides of the coil, preferably in the same direction, and shall lie in planes approximately parallel with each other. The projecting ends or arms 3 and 4 thus formed are to be connected, as hereinafter described, to the spring-bar 1 and side bars 5 of the vehicle, respectively. The arms 4 of each member of a complete spring are gradually tapered from the coils to their outer ends, as shown in Fig. 1, and are provided at such ends with eyes 6, whereby the arms 4 may be connected by means of shackles to the side bars 5. The arms 3, which are somewhat shorter than the arms 4, are secured to the under side of the spring-bar 1 by means of boxes 7, fitting over the arms and provided with flanges 8, whereby the boxes may be bolted to the spring-bar.

In order to prevent any longitudinal movement of the arms 3 in the boxes, the latter are provided with toes or projections 9, adapted to engage openings formed in the bottoms of the boxes or recesses formed in the spring-bar of the vehicle, as represented in dotted lines in Fig. 1.

As shown in the drawings, and as hereinbefore stated, a complete spring consists of two parts or members duplicates in size and construction, and when applied to a vehicle the parts or members are preferably arranged with the axes of the coils 2 in or approximately in line with each other, although they may be arranged with the coils in or approximately in the same vertical plane or in any other suitable manner.

While preferring the construction of spring shown in Figs. 1 and 2—*i. e.*, with the arms 3 and 4 projecting in the same direction as affording the greatest resistance to the load—I do not wish to limit myself to such an arrangement, as the arms may be made to project in opposite directions by forming a sharp backward bend in the arm 3, as shown in Fig. 3. The arms 4 may be made straight or with a single curve or with a double reverse curve, as circumstances or the fancy of the manufacturer may dictate.

In lieu of securing the arms 3 to the spring-bar 1 by means of the box 7, bolts provided with hooks or eyes for engaging the arms 3 may be employed.

I claim herein as my invention—

1. A vehicle-spring consisting of a coil provided with tangential arms, one of said arms being straight, in combination with a box constructed to fit said arm and clamp it to the vehicle-body, substantially as set forth.

2. A vehicle-spring consisting of a coil provided with tangential arms projecting outwardly in the same direction, one of said arms being provided with a toe or projection, in combination with a box constructed to clamp one of said arms to the vehicle-body, substantially as set forth.

In testimony whereof I have hereunto set my hand.

GEORGE BARDONNER.

Witnesses:
DARWIN S. WOLCOTT,
R. H. WHITTLESEY.